United States Patent
Lungren et al.

(10) Patent No.: US 11,618,824 B2
(45) Date of Patent: Apr. 4, 2023

(54) COMPOSITION COMPRISING A CONCENTRATE OF NATURAL ASPHALTENE IN FLUXING OIL SUITABLE FOR USE IN PREPARING ASPHALT BLENDS

(71) Applicant: AMERICAN GILSONITE COMPANY, Houston, TX (US)

(72) Inventors: Bart Lungren, Worland, WY (US); Joseph Lorenc, Philadelphia, PA (US); Brian Majeska, Daniel island, SC (US); Joseph Drbohlav, III, Inman, SC (US); Donald R. Sjogren, St. John, IN (US); Gregory S Lee, Kouts, IN (US)

(73) Assignee: AMERICAN GILSONITE COMPANY, Houston, TX (US)

( * ) Notice: Subject to any disclaimer, the term of this patent is extended or adjusted under 35 U.S.C. 154(b) by 264 days.

(21) Appl. No.: 16/523,519

(22) Filed: Jul. 26, 2019

(65) Prior Publication Data

US 2020/0032063 A1    Jan. 30, 2020

Related U.S. Application Data

(60) Provisional application No. 62/711,075, filed on Jul. 27, 2018.

(51) Int. Cl.
    *C08L 95/00*    (2006.01)
(52) U.S. Cl.
    CPC ........... *C08L 95/00* (2013.01); *C08L 2555/64* (2013.01)
(58) Field of Classification Search
    None
    See application file for complete search history.

(56) References Cited

U.S. PATENT DOCUMENTS

| | | | |
|---|---|---|---|
| 2,115,775 A | 5/1938 | Karr et al. | |
| 2,376,797 A | 5/1945 | Miller et al. | |
| 3,048,494 A | 8/1962 | Sawyer | |
| 3,162,101 A | 12/1964 | Rostler | |
| 4,094,696 A | 6/1978 | Burris | |
| 6,346,561 B1 * | 2/2002 | Osborn | B01F 3/1228 521/40.5 |
| 9,944,796 B1 | 4/2018 | Grzybowski | |
| 2005/0145136 A1 | 7/2005 | Butler et al. | |
| 2014/0230693 A1 | 8/2014 | Gonzalez Leon et al. | |
| 2019/0062558 A1 | 2/2019 | LaRusso et al. | |

FOREIGN PATENT DOCUMENTS

GB    2047716 A    12/1980

OTHER PUBLICATIONS

Hubbard et al. "Effect of Controllable Variables Upon the Penetration Test for Asphalts and Asphalt Cements" Journal of Agricultural Research, vol. 5 Issue 15 (Jan. 24, 1916}: pp. 805-818; p. 807.

* cited by examiner

*Primary Examiner* — Colin W. Slifka
(74) *Attorney, Agent, or Firm* — Norton Rose Fulbright US LLP

(57) ABSTRACT

The present disclosure relates to compositions comprising uintaite in a concentrated liquid form, and methods for producing the concentrated liquid uintaite. The composition can include uintaite in vegetable oils, paraffinic oils, naphthenic oils, and combinations thereof. The composition may include 50-90% by mass of a first component and 10-50% by mass of a second component, wherein the first component comprises uintaite, and wherein the second component comprises one or more oils.

12 Claims, No Drawings

COMPOSITION COMPRISING A CONCENTRATE OF NATURAL ASPHALTENE IN FLUXING OIL SUITABLE FOR USE IN PREPARING ASPHALT BLENDS

CROSS-REFERENCE TO RELATED PATENT APPLICATIONS

This application claims the benefit of priority of U.S. Provisional Patent Application No. 62/711,075 filed on Jul. 27, 2018, and entitled "Composition Comprising a Concentrate of Natural Asphaltene in Fluxing Oil Suitable for Use in Preparing Asphalt Blends," which is hereby incorporated by reference in its entirety.

FIELD OF THE INVENTION

The present invention relates to a composition that comprises a major component of the naturally occurring mineral asphaltene uintaite with a minor amount of a fluxing oil, forming a concentrate that is useful as a blending stock for asphalt binders for road paving applications, and for use as a base in asphalt emulsions.

BACKGROUND

Uintaite is an asphaltite, which is a naturally occurring solid hydrocarbon that is rich in asphaltenes and nitrogen compounds. It is glossy, black, and brittle, and contains little sulfur or ash. Although it appears similar to hard coal or asphalt, its chemical properties are significantly different. uintaite is soluble in aromatic and aliphatic solvents, as well as petroleum asphalt. Due to its unique compatibility, uintaite is sometimes used to harden softer petroleum products.

Uintaite is found naturally in parallel, near-vertical fractures in the Uinta Formation of the Uinta Basin of Northeastern Utah. The Uintaite-bearing factures often outcrop and may be as much as 2,000 feet deep. They vary in width from a few inches to 22 feet and may be as long as 25 miles. Average vein thickness is 6 feet, but veins as thin as 18 inches have been mined.

Uintaite is a very pure resinous rock, formed of a complex combination of different kinds of hydrocarbons. Its unique chemical and physical properties make uintaite a high-performance, multipurpose additive with applications in multiple industries. As an asphalt binder modifier, the unique properties of uintaite makes roads less susceptible to high-temperature and deformation performance issues. As an aggregate modifier, uintaite can be added directly at the hot mix plant with no additional equipment. The excellent bonding properties of uintaite will produce a high-strength, high-performance pavement that also resists water stripping. Uintaite can be used as a carbon additive for high-value iron castings with better finish and fewer imperfections. Uintaite improves paint-substrate bonding and serves as a high-performance, low-cost paint additive for anticorrosive paints, underbody paints and pipe coatings. When used as a wood stain additive, uintaite acts as a binder that protects the wood, and a pigment that gives a deep, rich color that resists fading.

Uintaite also has multiple uses in the oil and gas industry. When used as a drilling fluid additive, uintaite helps control fluid loss and seepage, stabilize shales, and increase wellbore stability. In drilling cementing operations, uintaite reduces cement slurry weight, controls free water, and prevents lost circulation. After uintaite-containing cement has set, uintaite increases cement flexibility, reduces cracking, and strengthens cement bonding to the formation and the casing.

Uintaite is mined in underground shafts and is initially obtained in solid form. Crude, mined uintaite is separated by temperature grade, dried, and screen-sized to customer specifications. Conventionally, uintaite is processed, transported, and used in its solid form.

SUMMARY

Embodiments of this disclosure allow for liquid handling of uintaite material. This can be advantageous because many industries use uintaite as an additive for various liquid-phase applications, such that it is desirable to provide uintaite in a concentrated liquid or liquefiable form.

One application for liquid uintaite is as an asphalt blending stock to improve the high temperature Performance Grading (PG) properties of asphalt blends, and as a base for asphalt emulsions. Other useful applications for liquid uintaite include as a base material or modifier for asphalt sealants and as a base material or modifier for asphalt roofing products. Furthermore, the liquid uintaite can be useful as a base material or modifier in industrial waterproofing applications in which ease of application and high temperature properties are important performance attributes.

A composition can be produced having a major component by mass of the natural asphaltene, uintaite, and a minor component of fluxing oils based on a mixture of natural oils and synthetic oils. The concentrate is unique in that it allows for the handling of uintaite as a liquid material as opposed to a powder. Furthermore, the liquid concentrate of uintaite and fluxing oils is formulated so that addition of the concentrate to asphalt results in an asphalt binder with improved elevated temperature shear strength (as measured using Dynamic Shear Rheometry) without compromising or causing a loss in low temperature. The creep properties of the binder can be as measured using the Bending Beam Rheometer (BBR).

In one embodiment of a manufacturing process, the liquid uintaite concentrate is formulated by physically blending a hard, or first, component with a soft, or second, component. The hard component is comprised of uintaite, a naturally occurring asphaltene resin that is mined in areas of the Western USA, and, preferably, Vacuum Tower Bottoms (VTB) a black, resinous material resulting from the distillation of crude oil under vacuum conditions. The soft component is comprised of one or more oils selected from the group consisting of vegetable oils, paraffinic oils, naphthenic oils, and mixtures thereof. Non-limiting examples of oils that may be used in the soft component include petroleum extracts, heavy paraffinic distillate solvent, and aromatic extract oils. In some embodiments, the soft component also contains one or more functionalized fatty acid alkyl ester additives to increase or improve the ability of the soft component to solvate the uintaite. A functionalized fatty acid alkyl ester is an ester whose carboxylic acid moiety includes one or more epoxide functional groups.

The composition can be pumped and handled as a liquid at typical asphalt processing conditions of 250 to 400° F. (121 to 204° C.). As a liquid concentrate, the composition avoids the logistical constraints, difficulties, and safety concerns associated with handling powdered (solid) forms of uintaite. Furthermore, the composition is suitable for improving the elevated temperature Performance Grading (PG) properties of asphalt binders without deteriorating the low temperature creep properties of the asphalt binder. The composition is suitable for use as an asphalt base to produce stable asphalt emulsions with relatively stiff residues having penetrations less than about 35 dmm at 25° C.

In some embodiments, a uintaite concentrate is provided as a concentrated asphaltene composition comprising 50-90% by mass of a hard component and 10-50% by mass of a soft component, where the hard component comprises uintaite and, optionally, vacuum tower bottoms, and the soft component comprises one or more oils. The one or more oils is selected from the group consisting of vegetable oils, paraffinic oils, and naphthenic oils. The soft component may further comprise up to 5% by mass of a fatty acid ester.

In some embodiments, the hard component comprises 50-100% by mass of uintaite. In further embodiments, the hard component comprises 55-85% by mass of uintaite and 15-45% by mass of vacuum tower bottoms. In some embodiments, the soft component comprises 40-60% by mass of vegetable oils and 60-40% by mass of paraffinic or naphthenic oils, or a combination thereof. The soft component may further comprise up to 5% by mass of a fatty acid ester.

In some embodiments, the hard component comprises 60-80% by mass of the composition, and the soft component comprises 20-40% by mass of the composition. In further aspects, the hard component comprises 55-85% by mass of uintaite and 15-45% by mass vacuum tower bottoms. In some embodiments, the hard component comprises 65-75% by mass of the composition, and the soft component comprises 35-25% by mass of the composition. In some embodiments, the hard component comprises 55-85% by mass of uintaite and 15-45% by mass vacuum tower bottoms.

Preferably, the hard component comprises 50-90%, by mass, of the overall composition. More preferably, the hard component comprises 60-80% by mass of the overall composition. Most preferably, the hard component comprises 65% to about 75% of the overall composition. Preferably, the soft component comprises 10-50% by mass of the overall composition. More preferably, the soft component comprises 20-40% of the overall composition. Most preferably, the soft component comprises about 25-35%, by mass, of the overall composition.

Preferably, the hard component is comprised of 50-100% by mass of uintaite, with the remainder comprising Vacuum Tower Bottoms (VTB). More preferably, the hard component is comprised of about 55 to 85% by mass of uintaite, with the balance comprising VTB. Preferably, the soft component is composed of roughly equivalent portions of natural vegetable oil and a paraffinic or naphthenic oil, or a combination thereof, by mass. Preferably, the soft contains 5% or less, by mass, of a functionalized alkyl ester of a fatty acid to improve solvation of the uintaite.

In particular embodiments, a uintaite concentrate comprises 75-85% by mass of the first component and 15-25% by mass of the second component, wherein the first component comprises 48-52% by mass uintaite and 52-48% by mass vacuum tower bottoms, and the second component comprises 42-45% by mass paraffinic and/or naphthenic oil, 49-53% by mass vegetable oil, and 3-9% by mass functionalized methyl ester.

A method for making embodiments of liquid uintaite concentrated asphaltene composition may include the steps of combining the one or more oils to produce the soft component, blending and heating the soft component to a temperature of at least 160° C., optionally, adding the vacuum tower bottoms to the blending and heated soft component, and adding the uintaite to the blended and heated soft component. In some embodiments, the heating temperature ranges from 160° C. to 200° C. In some embodiments, the uintaite is provided in powder form.

In some embodiments, an alternative method for making the liquid uintaite concentrated asphaltene composition comprises the steps of blending the one or more oils, the optional vacuum tower bottoms, and the optional fatty acid ester. The blended components are heated until a homogeneous state is reached. The heated, homogeneous mixture of liquids is a liquid base. The liquid base is subjected to measurement of rotational viscosity at 140° F. (60° C.) using a Brookfield Viscometer. The liquid base is subjected to measurement of needle penetration value at a temperature of 35° F. (~2° C., ice water bath temperature) using an asphalt penetrometer. If the liquid base has a rotational viscosity greater than about 10,000 cPs at 140° F., vegetable oil and/or functionalized methyl ester are added to the liquid base until the viscosity is less than 10,000 cPs. If the liquid base has a rotational viscosity less than about 7000 cPs, VTB are added until the viscosity is greater than about 7000 cPs. If the liquid base has a penetration less than about 75 dmm at 35° F., vegetable oil or functionalized methyl ester are added to the liquid base until the penetration is greater than about 75 dmm at 35° F. When the liquid base satisfies the rotational viscosity and penetration specifications described above, the liquid base is stirred and heated to a temperature of about 160° C. to 200° C., and the uintaite powder is added until the uintaite is fully digested into the composition.

When the liquid base is formulated such that the viscosity is preferably in the range of 7000-10,000 cPs at 140° F. (60° C.), and the needle penetration is greater than about 75 dmm at 35° F. (~2° C.), the resulting liquid uintaite (i.e., after addition of the uintaite powder) will possess properties (viscosity, high temperature shear strength, etc.) suitable for use as an asphalt modifier. If the liquid base is formulated such that the viscosity is preferably in the range of 8000-9000 cPs at 140° F., and the needle penetration is greater than about 85 dmm at 35° F., the resulting liquid uintaite will possess properties more suitable for use as an asphalt modifier. One embodiment of the disclosure is a liquid base capable of forming a composite with uintaite powder. Such a liquid base formulation for solvating uintaite has a viscosity in the range of 7,000 to 10,00 cPs at 140° F.; and a needle penetration greater than about 75 dmm at 35° F.

The terms "a" and "an" are defined as one or more unless this disclosure explicitly requires otherwise. The term "substantially" is defined as being largely but not necessarily wholly what is specified (and include wholly what is specified) as understood by one of ordinary skill in the art. In any disclosed embodiment, the term "substantially" may be substituted with "within [a percentage] of" what is specified, where the percentage includes 0.1, 1, 5, and 10 percent. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a column that "comprises," "has," "includes" or "contains" one or more elements possesses those one or more elements, but is not limited to possessing only those one or more elements. Likewise, an element of a system or composition that "comprises," "has," "includes" or "contains" one or more features possesses those one or more features, but is not limited to possessing only those one or more features.

The feature or features of one embodiment may be applied to other embodiments, even though not described or illustrated, unless expressly prohibited by this disclosure or the nature of the embodiments. Any embodiment of any of the disclosed composition, system, or process can consist of or consist essentially of, rather than comprise/include/contain/have, any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb. Details associated with the embodiments described above and others are presented below.

DETAILED DESCRIPTION

Various features and advantageous details are explained more fully with reference to the non-limiting embodiments that are illustrated in the accompanying drawing and detailed in the following description. It should be understood, however, that the detailed description and the specific examples, while indicating embodiments of the invention, are given by way of illustration only, and not by way of limitation. Various substitutions, modifications, additions, and/or rearrangements will become apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A liquid uintaite composition may be prepared using standard high-speed mixing equipment by blending all the liquid components together, while heating to a temperature of about 165° C. Thereafter, the uintaite powder is added in portions, with stirring until a smooth and homogeneous mixture is obtained. Thereafter, the rotational viscosity of the concentrate can be measured using equipment well known to those skilled in the art of handling liquid asphalt materials. Preferably, the uintaite powder is added in 6-12 additions, equally spaced in time, with the composition stirred at a temperature range of at least about 165° C., but below 200° C., until the uintaite is fully digested into the composition. Using a Brookfield viscometer to measure rotational viscosity, it is preferable that the rotational viscosity of the concentrate be less than about 3500 cps at 177° C., and more preferably less than about 2500 cps at 177° C. Most preferably, the rotational viscosity is less than 2000 cps at 177° C.

Once produced, the uintaite concentrate of the current invention can be used to prepare asphalt blends with improved elevated temperature shear strength for Performance Graded (PG) asphalt binders. For example, 5-15% by mass of the concentrate of the current invention, depending on specific composition used, can be added to a base asphalt to increase its Performance Grade (PG) by 3 to 10° C. according to the Strategic Highway Research Program (SHRP) methodology for grading asphalt binders. Addition of each 1% by mass of uintaite, added to a base asphalt, will increase the elevated temperature PG grade of the base asphalt by at least about 0.6° C. Preferably, when the base asphalt is tested for low temperature creep properties using the Bending Beam Rheometer (BBR), the loss of Performance Grade (PG) is less than 0.1° C. for each 1% by mass of uintaite added. Thus, the use of a uintaite concentrate made according to the current invention can beneficially increase the PG performance range of an asphalt binder, providing improved performance across an expanded temperature range.

The compositions disclosed herein can also be used to prepare asphalt binders especially suitable for preparing asphalt emulsions with relatively stiff, or low needle penetration residue properties, while at the same time resisting settlement in storage. The use of preferable soft components facilitate the ease of emulsification of the asphalt binders that contain a portion of the uintaite concentrates. The hard component of the composition provides for improved stiffness and reduced needle penetration of the resulting asphalt emulsion residues. The soft component of the composition provides for ease of emulsification, and propensity for the emulsions to remain stable against settlement in storage.

Examples

Table 1 below shows several compositions prepared according to the current invention to illustrate the benefits associated therein. Table 1 also shows several compositions for comparative purposes that fall outside the preferable range of compositions.

Example 1 is provided for comparison purposes and shows a composition with a hard component that exceeds 80% of the total mass of the composition. In addition, Example 1 does not contain any functionalized alkyl ester of a fatty acid, which is preferred to achieve ideal solubility of the uintaite. Example 1 produced a concentrate that had excess rotational viscosity and showed evidence of non-homogeneity.

Example 2 is also provided for comparison purposes and shows a composition in which the hard component is comprised of 100% by mass of uintaite (no VTB). This concentrate also showed excessive rotational viscosity and indications of non-homogeneity.

Example 3 provides a formula for a uintaite concentrate with hard component comprising 75% by mass of the overall composition, but the soft component does not include a functionalized alkyl ester of a fatty acid. This concentrate showed elevated rotational viscosity.

TABLE 1

Examples of Concentrates

Composition of Uintaite Concentrates*

| | Hard Component | | Soft Component | | |
|---|---|---|---|---|---|
| EXAMPLE | Uintaite | VTB | Vegetable Oil | Paraffinic or Naphthenic Oil | Functionalized Methyl Ester |
| 1 | 75 | 8 | 9 | 8 | 0 |
| 2 | 75 | 0 | 24 | 0 | 1 |
| 3 | 65 | 11 | 11 | 13 | 0 |
| 4 | 60 | 13 | 12 | 14 | 1 |
| 5 | 40 | 33 | 12 | 14 | 1 |
| 6 | 55 | 10 | 0 | 35 | 0 |
| 7 | 40 | 42 | 9 | 8 | 1 |
| 8 | 40 | 39 | 11 | 9 | 1 |

*Percent by mass of total composition

In Examples 4 and 5, the total hard component of the composition is less than 75% by mass, and both Examples have hard components comprised of both uintaite and VTB. In addition, both Examples 4 and 5 contain an additive comprising a functionalized alkyl ester of a fatty acid. Both Example 4 and 5 showed acceptable rotational viscosity below 2500 cps at 177° C. and were homogeneous.

Example 6 contains 65% by mass total hard component and contains only paraffinic oil. Example 6 does not contain a functionalized alkyl ester of a fatty acid, but at a relatively lower hard component content, the composition shows acceptable solvation of the uintaite and a lack of non-homogeneity.

Table 2 below shows the rotational viscosity of the Example 1-6 concentrates, as well as the performance of the concentrates when used to increase the Performance Grading (PG) performance temperature range of asphalt blends.

Comparative examples 1, 2, and 3 were deemed to have excessively high rotational viscosities, making them difficult to handle and not preferred as blending materials for PG graded asphalts. Examples 4, 5, and 6 illustrate the performance of compositions made according to the current invention in terms of their ability to increase the PG range of asphalt blends, while having a relatively low rotational viscosity allowing for ease of use. In all cases, the preferred compositions demonstrate an ability to increase the elevated temperature PG grade of the asphalt more than 0.5° C. for each 1% by mass of added uintaite. The examples made according to the current invention decrease the low temperature PG performance by no more than 0.1° C. for each 1% by mass of added uintaite. The net effect of using the compositions according to the current invention as embodied in Examples 4, 5, and 6 is to provide a net increase in the PG temperature performance range of the asphalt blends thus prepared.

TABLE 2

Viscosity and Performance Grading (PG) Data of Asphalt Blends Prepared from Example Concentrates 1-8

| Example | Rotational Viscosity (cPs) | Rotational Viscosity Temperature (° C.) | High Temperature PG Gain (° C.) per % Uintaite | Low Temperature PG Loss (° C.) per % Uintaite |
|---|---|---|---|---|
| 1 | 6550 | 191 | Too Viscous/Non-homogeneous | Too Viscous/Non-homogeneous |
| 2 | 4125 | 177 | Too Viscous/Non-homogeneous | Too Viscous/Non-homogeneous |
| 3 | 4300 | 177 | Too viscous | Too viscous |
| 4 | 1847 | 177 | 0.62 | 0.10 |
| 5 | 1985 | 149 | 0.54 | 0.06 |
| 6 | 1200 | 177 | 0.98 | 0.05 |
| 7 | 2700 | 149 | 0.84 | Not tested |
| 8 | 2887 | 149 | 0.88 | Not tested |

Table 3 below shows two Examples of Asphalt Emulsions prepared from compositions of uintaite with fluxing oils. Examples 9 and 10 were prepared by diluting Example 3 with additional base asphalt to prepare an asphalt emulsion base having relatively high stiffness (low needle penetration). Both Examples 9 and 10 provide asphalt bases having a needle penetration value of 25 dmm at 25° C. Asphalt seal coats, and other similar pavement coatings, show enhanced resistance to scuffing under shear when the asphalt has high stiffness (low penetration) values. It is often difficult to prepare stable asphalt emulsions from asphalts having such low penetration values. For Examples 9 and 10, both resulting asphalt emulsions were very stable, had high residue (solids content) and acceptable viscosity, indicating an emulsion with small particle size of the dispersed asphalt phase. The combination of hard and soft components provide a chemical composition having rheological properties that yield stable emulsions from asphalt bases with unusually high stiffness (low penetration) values.

TABLE 3

Examples of Asphalt Emulsions Prepared from Compositions of the Current Invention

| Example | Uintaite Concentrated Used (Mass % of Blend) | Base Asphalt Used (Mass % of Blend) | Resulting Asphalt Penetration Value (dmm, 25° C.) | Asphalt Emulsion Properties |
|---|---|---|---|---|
| 9 | Example 3 (29%) | Midwest PG 64-22 (71%) | 25 | 0% Sieve; 63.3% Residue; Viscosity 77° F., (sfs) = 31; No settlement at 4 days |
| 10 | Example 3 (35%) | East Coast PG 64-22 (65%) | 25 | 0% Sieve; 62.7% Residue; Viscosity 77° F. (sfs) = 28; No settlement at 4 days |

When using the alternative method for producing liquid uintaite, the liquid base for Example 7 had a rotational viscosity of 8596 cPs at 140° F., prior to addition of the uintaite powder. Likewise, the liquid base for Example 8 had a rotational viscosity of 8925 cPs at 140° F. and a needle penetration value of 82 dmm at 35° F., prior to addition of the uintaite powder. These measurements are within the specification ranges set forth for this alternative means of producing a liquid concentrate of uintaite, and the resulting properties given in Table 2 show that the compositions are suitable for use as an asphalt modifier.

The claims are not to be interpreted as including means-plus- or step-plus-function limitations, unless such a limitation is explicitly recited in a given claim using the phrase (s) "means for" or "step for," respectively.

The invention claimed is:

1. A composition, comprising:
   50-90% by mass of a first component and 10-50% by mass of a second component,
   wherein the first component comprises uintaite, and
   wherein the second component comprises one or more oils and an ester, wherein a carboxylic acid moiety of the ester comprises one or more epoxide functional groups.

2. The composition of claim 1, wherein the first component comprises 50-100% by mass of uintaite.

3. The composition of claim 1, wherein the first component comprises 55-85% by mass of uintaite and 15-45% by mass of vacuum tower bottoms.

4. The composition of claim 1, wherein the one or more oils is selected from the group consisting of vegetable oils, paraffinic oils, naphthenic oils, and combinations thereof.

5. The composition of claim 1, wherein the second component further comprises up to 5% by mass of the fatty acid ester.

6. The composition of claim 1, wherein the first component comprises 60-80% by mass of the composition, and the second component comprises 20-40% by mass of the composition.

7. The composition of claim 6, wherein the first component comprises 55-85% by mass of uintaite and 15-45% by mass vacuum tower bottoms.

8. The composition of claim 1, wherein the first component comprises 65-75% by mass of the composition, and the second component comprises 35-25% by mass of the composition.

9. The composition of claim 8, wherein the first component comprises 55-85% by mass of uintaite and 15-45% by mass vacuum tower bottoms.

10. The composition of claim 1, wherein the second component comprises 40-60% by mass of vegetable oils and 60-40% by mass of paraffinic or naphthenic oil, or a combination thereof.

11. The composition of claim 10, wherein the second component further comprises up to 5% by mass of the ester.

12. The composition of claim 1, comprising:
75-85% by mass of the first component; and
15-25% by mass of the second component,
wherein the first component comprises 48-52% by mass uintaite and 52-48% by mass vacuum tower bottoms, and
wherein the second component comprises 42-45% by mass paraffinic and/or naphthenic oil, 49-53% by mass vegetable oil, and 3-9% by mass of the ester.

\* \* \* \* \*